(12) United States Patent
Bagley et al.

(10) Patent No.: US 8,726,525 B2
(45) Date of Patent: May 20, 2014

(54) MAGNETIC PEELER SET

(75) Inventors: Justin Bagley, Seattle, WA (US); Sascha Kaposi, Tacoma, WA (US)

(73) Assignee: Progressive International Corporation, Kent, WA (US)

(*) Notice: Subject to any disclaimer, the term of this patent is extended or adjusted under 35 U.S.C. 154(b) by 484 days.

(21) Appl. No.: 13/006,112

(22) Filed: Jan. 13, 2011

(65) Prior Publication Data

US 2011/0167645 A1 Jul. 14, 2011

Related U.S. Application Data

(60) Provisional application No. 61/294,633, filed on Jan. 13, 2010.

(51) Int. Cl.
*A47J 17/02* (2006.01)
(52) U.S. Cl.
USPC .................................................. 30/279.2
(58) Field of Classification Search
CPC ........... A47J 17/02; A47J 17/04; A47J 17/06; A47J 17/08; A47J 17/10; A47J 9/002
USPC ............... 30/322–328, 278–279.6, 280, 304, 30/120.1, 123.5, 294, 142–150, 340, 342; D7/393, 395, 693–695; 241/92–95, 241/168, 169, 169.1, 273.1–273.5; 99/495, 99/584, 588
See application file for complete search history.

(56) References Cited

U.S. PATENT DOCUMENTS

| | | | | | |
|---|---|---|---|---|---|
| 2,853,780 | A | * | 9/1958 | Bull | 30/327 |
| 3,009,245 | A | * | 11/1961 | Senkewitz | 30/279.6 |
| 3,220,110 | A | * | 11/1965 | Popeil | D7/695 |
| 3,621,899 | A | * | 11/1971 | Hula | D7/695 |
| 4,317,284 | A | * | 3/1982 | Prindle | 30/340 |
| 4,524,512 | A | * | 6/1985 | Formo et al. | 30/147 |
| 4,632,347 | A | * | 12/1986 | Jurgich | 248/213.2 |
| 4,691,440 | A | * | 9/1987 | Ushigome | 30/322 |
| 4,995,154 | A | * | 2/1991 | Bamber | 30/147 |
| D420,867 | S | | 2/2000 | Lion et al. | |
| D437,793 | S | * | 2/2001 | Kaposi et al. | D10/46.2 |
| D438,125 | S | * | 2/2001 | Kaposi et al. | D10/46.2 |
| D458,519 | S | * | 6/2002 | Tse | D7/673 |
| D486,703 | S | * | 2/2004 | Settele | D7/695 |
| D502,063 | S | * | 2/2005 | Lee | D7/695 |
| 6,874,236 | B2 | * | 4/2005 | Levien et al. | 30/279.6 |
| 7,013,568 | B2 | * | 3/2006 | Schmidt | 30/147 |
| 7,162,802 | B2 | * | 1/2007 | Benardeau et al. | 30/340 |
| D536,222 | S | * | 2/2007 | Heiberg et al. | D7/645 |
| 7,415,769 | B2 | * | 8/2008 | Hughes | 30/321 |
| D609,062 | S | * | 2/2010 | Kestenbaum | D7/695 |

(Continued)

FOREIGN PATENT DOCUMENTS

DE 102010028178 A1 * 10/2011
WO 04000689 12/2003

(Continued)

*Primary Examiner* — Jason Daniel Prone
(74) *Attorney, Agent, or Firm* — Lowe Graham Jones PLLC

(57) ABSTRACT

A fruit or vegetable peeler includes a handle with a blade, in which the peeler is shaped such that a first peeler can nest with or be secured to a second peeler. In some versions, the peeler includes a magnet secured to the peeler such that a first peeler is magnetically attracted to a second peeler having a similar attached magnet.

8 Claims, 3 Drawing Sheets

(56) References Cited

U.S. PATENT DOCUMENTS

| | | | |
|---|---|---|---|
| 7,694,823 B2 * | 4/2010 | Fontanesi | 206/576 |
| D625,153 S * | 10/2010 | Gallop et al. | D7/645 |
| 7,816,634 B1 * | 10/2010 | Guide et al. | 30/150 |
| D626,387 S * | 11/2010 | Hawker | D7/693 |
| D630,913 S * | 1/2011 | Mishan et al. | D7/693 |
| D645,697 S * | 9/2011 | Hawker et al. | D7/695 |
| D669,325 S * | 10/2012 | Evans | D7/695 |
| D674,253 S * | 1/2013 | Spiegel | D7/695 |
| D674,254 S * | 1/2013 | Spiegel | D7/695 |
| D675,890 S * | 2/2013 | Reay | D7/695 |
| D679,964 S * | 4/2013 | Deconzo | D7/695 |
| 8,418,971 B2 * | 4/2013 | Rayko et al. | 248/37.6 |
| D683,200 S * | 5/2013 | Joseph | D7/695 |
| D684,021 S * | 6/2013 | Lion et al. | D7/695 |
| 2005/0262703 A1* | 12/2005 | Best et al. | 30/279.6 |
| 2005/0278957 A1* | 12/2005 | McCullough | 30/279.6 |
| 2006/0272161 A1* | 12/2006 | Di Bitonto et al. | 30/279.6 |
| 2007/0227013 A1* | 10/2007 | Kaposi | 30/279.6 |
| 2008/0142401 A1* | 6/2008 | Trannon | 206/524.6 |
| 2010/0089151 A1* | 4/2010 | Mantilla et al. | 206/505 |
| 2010/0229643 A1 | 9/2010 | Lee | |
| 2011/0296693 A1* | 12/2011 | Oakes | 30/142 |
| 2012/0011727 A1* | 1/2012 | Yang | 30/150 |
| 2012/0031805 A1* | 2/2012 | Stolarczyk | 30/324 |
| 2012/0042520 A1* | 2/2012 | Simeray | 30/143 |
| 2012/0198930 A1* | 8/2012 | Hood et al. | 73/429 |
| 2012/0222312 A1* | 9/2012 | Bordas | 30/123.6 |
| 2012/0304469 A1* | 12/2012 | Powell | 30/143 |
| 2013/0305935 A1* | 11/2013 | Ebrahim et al. | 30/123.5 |
| 2014/0013967 A1* | 1/2014 | Bagley | 99/538 |

FOREIGN PATENT DOCUMENTS

| | | | |
|---|---|---|---|
| WO | WO 04000689 A1 * | 12/2003 | |
| WO | 2006131005 | 12/2006 | |
| WO | WO 2006131005 A1 * | 12/2006 | |
| WO | WO 2011088220 A1 * | 7/2011 | |
| WO | WO 2011099927 A1 * | 8/2011 | |

* cited by examiner

MAGNETIC PEELER SET

PRIORITY CLAIM

This application claims the benefit of prior U.S. Provisional application No. 61/294,633, filed Jan. 13, 2010, the contents of which are hereby incorporated by reference.

FIELD OF THE INVENTION

This invention generally relates to devices for removing a peel from vegetables and fruits.

BACKGROUND OF THE INVENTION

Vegetable peelers of the type having a handle and a pivotable blade with a central opening have been in use for many years. The blades are often very sharp, and storage of multiple peelers makes it more likely that the user may cut a finger when retrieving a peeler from a storage drawer. The peelers in accordance with the invention are configured to be nestable with one another or to otherwise attach to one another in order to provide for more compact storage and reduced exposure to multiple blades.

SUMMARY OF THE INVENTION

The preferred example of a vegetable peeler in accordance with the present invention includes a handle with a blade. The peeler includes a magnet secured to the peeler such that a first peeler is magnetically attracted to a second peeler having a similar attached magnet. Accordingly, multiple peelers having a similar configuration can be attached to or nested against one another for storage.

In some versions of the invention, the magnet is embedded within the handle and surrounded by plastic or other materials forming the handle.

In other versions of the invention, at least some portion of the magnet may be exposed, either along a top or a bottom portion of the handle for example.

While the magnet is preferably secured to the handle, in yet other versions of the invention the magnet may be secured to the working end of the peeler or at a juncture between the handle and the working end of the peeler.

Most preferably, the peeler is formed in a shape such that a first peeler can fit closely adjacent a second peeler in a nesting fashion. Accordingly, an upper surface of a first peeler is preferably formed to fit closely adjacent a lower surface of a second peeler for compact storage. In a most preferred configuration, the peeler is configured such that the magnet of a first peeler will lie closely adjacent a magnet of a second peeler when two peelers are positioned next to one another and in a common alignment.

BRIEF DESCRIPTION OF THE DRAWINGS

The detailed description of the invention is made with reference to the following drawings.

DETAILED DESCRIPTION OF THE PREFERRED EMBODIMENT

Figure 4:
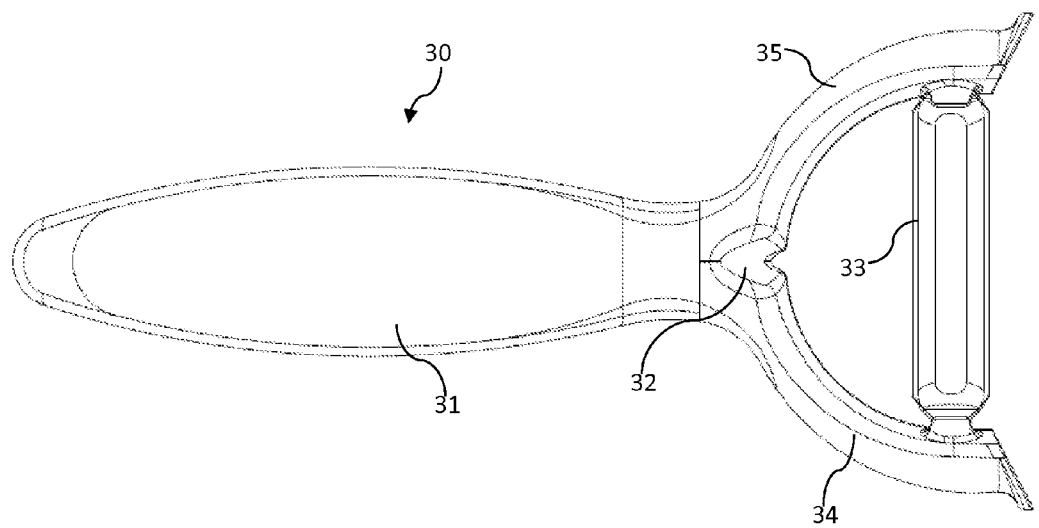
FIG. 4 is a top view of a single preferred peeler.
Figure 5:
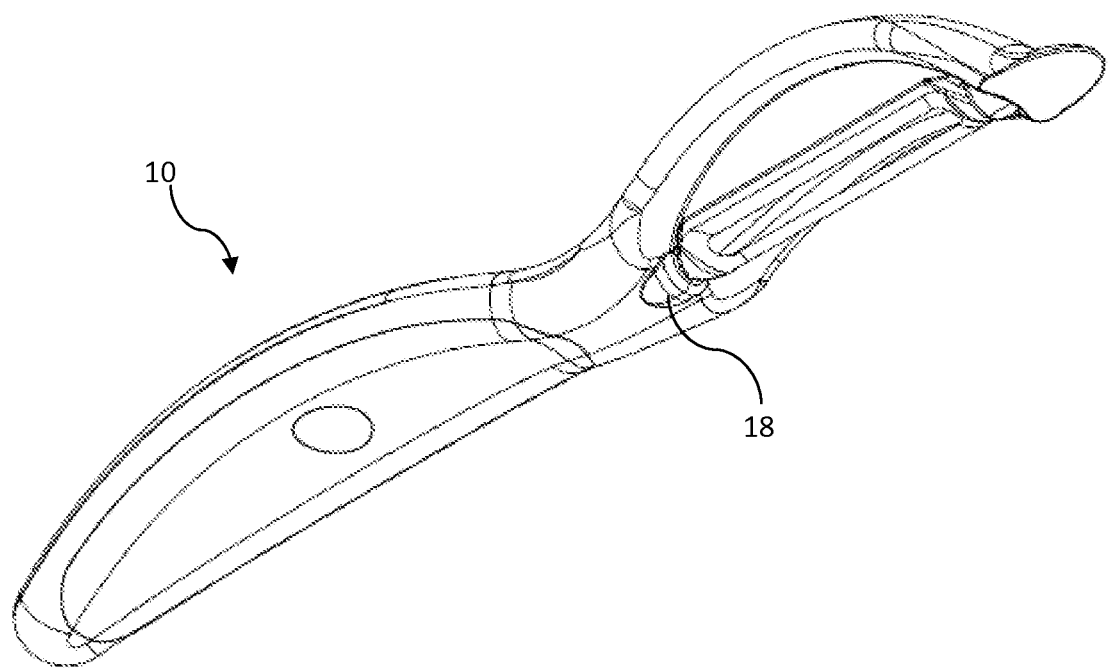
FIG. 5 is a bottom perspective view of a single peeler.

As illustrated in the figures, a vegetable peeler typically includes a handle with an attached blade. Although the blade configuration may vary, commonly the blade is either oriented such that the sharpened blade edge is axially aligned with the handle (referred to as a "straight peeler" such as best seen in FIG. 5) or is orthogonal to the handle to form a Y-shape (referred to as a "Y-peeler" such as best seen in FIG. 4). In either case, peelers in accordance with the present invention are configured so that they can be secured to one another for easy storage. Thus, in FIG. 1 three peelers are shown positioned together, including a first straight peeler 10, a second straight peeler 20, and a third Y-peeler 30. Although not shown, more than three peelers may be secured or nested against one another if desired.

The peelers are each preferably shaped so that they nest with other peelers, meaning that they have complementary surfaces so that they can readily remain in contact with one another. The nesting aspect may be achieved in a variety of ways, and in the preferred example the peelers include a handle having an upper side and a lower side in which the upper side of the handle is sized and shaped to closely adjacent the lower side of another peeler. As best seen in the sectional view of FIG. 3, in the preferred version of the invention the handles of adjacent peelers are in contact with one another substantially along most of the length of the handle.

The exemplary peeler includes a handle and a tool head having a pivotable blade attached. Most preferably, the handle 11 for a straight peeler is configured to have substantially the same shape as the handle 31 for a Y-peeler. Likewise, the straight peeler includes a tool head having a blade 15 and the Y-peeler includes tool head having a blade 33. In either case, the handle has a distal end 16 opposite the tool head and a proximal end 17 that is secured to (or integrally formed with) the tool head.

In one version, the handle is bowed upward between the distal end and the proximal end, forming a generally curved, convex upper surface. This bowed shape is most readily visible in the sectional view of FIG. 3. As illustrated, the lower surface of the handle of a first peeler follows the same path of curvature as the upper surface of the handle of a second peeler, such that the upper surface of one peeler can fit snugly against the lower surface of another peeler.

In a preferred version the upper and lower surfaces of the handle closely follow a common shape for contact generally along the entire surface. This configuration is best seen in the sectional view of FIG. 3, in which a central portion of the handles of adjacent peelers are substantially in contact with one another along the entire length of the handle. In other versions there is a substantial similarity in the shape of the upper and lower surfaces of the handle that may include a significant degree of common contact when nested but may also allow for some gaps.

Although the handles of the preferred version are bowed upwardly between the distal and proximal ends to form a convex shape at the central region, in alternate versions of the invention the handles may be bowed in the opposite direction or may be generally flat, so long as they include complementary upper and lower surfaces that are configured to be nestable or otherwise fit adjacent one another. In yet other versions, the handles may have any shape so long as, when two peelers are positioned next to one another, the magnets (discussed further below) from the pair of peelers have a sufficiently strong attractive force to hold the peelers against one another.

The tool head of the peeler includes a blade. In most cases, the blade is a conventional peeling blade having a central opening that is sharpened along the interior edges of the central opening. A pair of opposing axles extend outward from the blade to connect it to the tool head in a fashion that allows the blade to pivot within the tool head. One or more mechanical stops may be provided in order to restrict the pivotal movement to a relatively narrow range of motion. In some versions, the blade may be removable or may include features for scalloped or other forms of peeling.

Particularly with the straight peeler, the location of the blade provides a challenge when making the peeler so that it can nest with other peelers. Traditional straight peelers include a tool head with a blade holder that is raised or otherwise shaped in a way that prevents one peeler from truly nesting with another. In the preferred example, the tool head is formed in a V-shape as viewed from the tip of the tool head and looking toward the handle. Adjacent the proximal end of the handle, the tool head branches out into a pair of prongs 12, 14 which diverge slightly to create a central opening, then converge again at the tip of the tool head. The blade 15 is secured at the apex of the V-shape formed by the tool head, with the prongs 12, 14 forming the uprights of the V-shape. At a central portion of the blade, the prongs extend outward, radially away from the axis generally defined by the blade. Because each prong diverges outward in a direction that is non-orthogonal to the other prong, the prongs form a V-shape that extends upward and away from the blade. Accordingly, the tool head forms an internal concavity that is sized and configured to receive a blade and portion of a tool head from another peeler.

Viewed from the side (that is, the perspective of FIG. 3), the tool head follows an arc of curvature as it extends from the proximal end of the handle toward the tip of the tool head. A central portion of the tool head is therefore bowed upward between the distal end of the handle and the tip of the tool head, thereby creating an arch for receiving the peeler blade. In the preferred version, when the peeler is resting on a horizontal surface, the distal end of the handle, proximal end of the handle, and tip of the tool head are each substantially tangential with the surface while a gap is provided below the middle of the handle and the middle of the tool head.

The peeler blade is secured to the tool head between the two ends of the tool head, one adjacent the tip of the tool head and the other adjacent the proximal end of the handle. In the preferred example, the blade is substantially parallel to a central axis of the tool, which is also parallel to a counter or other horizontal surface on which the tool may be placed.

The shape of the tool head forms an interior space for receiving a blade and tool head of another peeler. Thus, the two prongs of a first tool head are separated by a width that is sufficiently large to receive the blade of a second tool head when the second peeler is nested on top of the first peeler. When the second blade is received within the first pair of prongs, the second blade lies beneath a majority of the prongs. This allows the blade of the second peeler to be shielded by the first peeler, reducing the number of sharp edges that are exposed when stored in a drawer.

Figure 1:
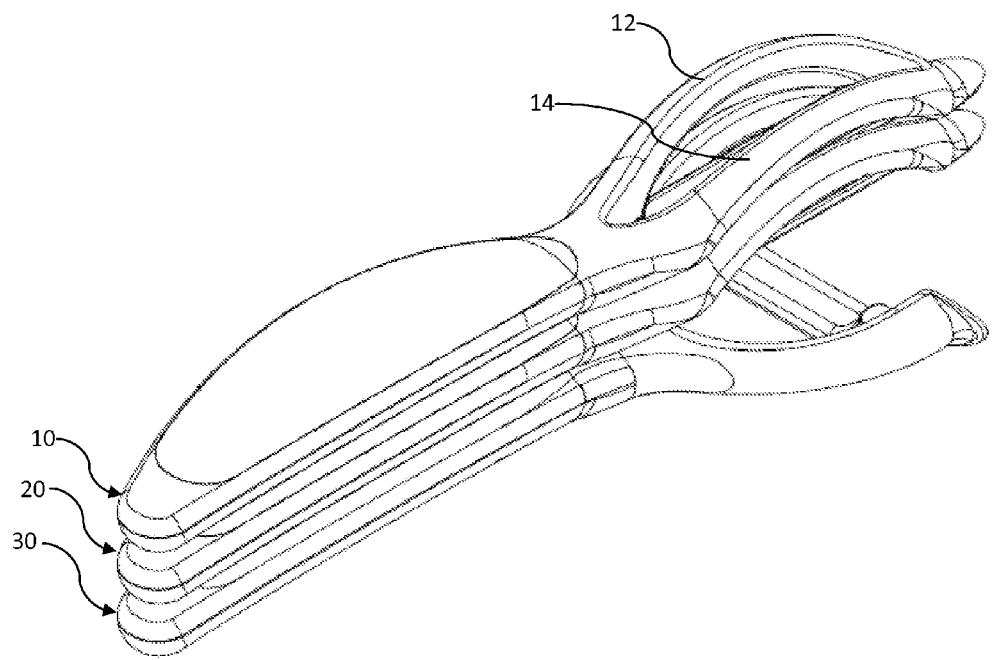
FIG. 1 is a perspective view of a preferred version of the invention in which three peelers are attached to one another.
Figure 2:
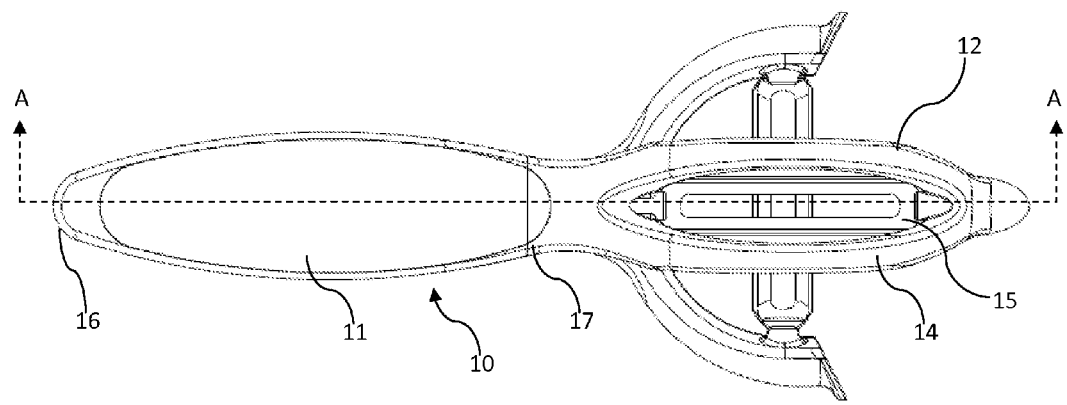
FIG. 2 is a top view of the peeler set shown in FIG. 1.
Figure 3:
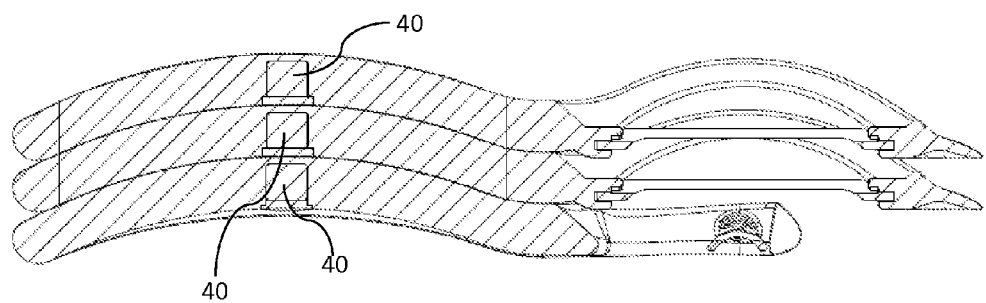
FIG. 3 is a sectional view of the set of peelers of FIG. 1, taken along sectional line A-A shown in FIG. 2.

A Y-shaped peeler is also configured to be nestable with other peelers, including straight peelers such as described above. The preferred Y-peeler includes a handle and a tool head formed by a pair of prongs 34, 35, and in order to facilitate nesting the handle is shaped in substantially the same manner as with the straight peeler. Thus, when nesting, the handles of either Y-peelers or straight peelers can each nest with one another, such as is shown in FIGS. 1 and 3.

Because the blade of the Y-peeler is generally orthogonal to the central axis of the handle, the prongs of the tool head diverge outward so that the tool generally forms a Y-shape. The two prongs may form a sharp angle with respect to one another, thereby forming essentially a V-shape in the tool head, or may be more softly curved to form a U-shape. In the illustrated version, the prongs of the tool head are curved to form substantially a U-shape. A pivotable peeling blade 33 is secured between the ends of the prongs 34, 35.

In order to better facilitate nesting of a straight peeler on top a Y-peeler, the preferred Y-peeler includes a notch 32 formed substantially at the distal end of the handle, located where the two prongs of the tool head meet. The notch is formed to be able to receive a portion of the blade from a straight peeler so that the straight peeler can nest within the Y-peeler. The lower surface of the straight peeler 10 may also include a projection 18 (best seen in FIG. 5) that is formed with a shape complementary to the notch so that it may be received within the notch. Likewise, the upper surface of the straight peeler may be formed with a notch for receiving the projection, or an equivalent notch-shape may be formed at the juncture of the prongs of the peeler. In some versions of the preferred Y-peeler, the juncture of the tool head prongs further includes opposing raised shoulders on opposite sides of the notch to increase the depth of the notch and provide a larger area for receiving a nesting peeler.

While the complementary shapes of the peelers may suffice to facilitate nesting, in the preferred version of the invention magnets are also provided in the handles to hold the peelers against one another. Thus, at a central location along the handle, a magnet 40 is embedded within the handle. The magnet may be molded within the handle or glued or otherwise secured to a surface of the handle or a cavity formed in the handle. The poles of the magnets are aligned within the handle such that the upper surface of a first handle is attracted to the lower surface of a second handle, thereby providing an attractive force to hold the peelers against one another when placed in a nesting position.

In one version of the invention, the peelers are provided as a group, in which a first peeler is a Y-shaped peeler configured as described above. A second peeler is a straight peeler having a blade with scalloped edges, and a third peeler is a straight peeler having a standard straight blade. The third peeler is nested within the second peeler, which in turn is nested within the first peeler such that all three are held together by the mating nestable surfaces and the embedded magnets.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A vegetable peeler set, comprising:
   a first peeler, comprising:
   a first handle having a first distal end and a first proximal end;
   a first tool head secured to the first proximal end of the first handle, the first tool head having a first blade mounted on the first tool head; and
   a first magnet secured to the first handle; and
   a second peeler, comprising:

a second handle having a second distal end and a second proximal end;

a second tool head secured to the second proximal end of the second handle, the second tool head having a second blade mounted on the second tool head; and a second magnet secured to the second handle;

whereby the first magnet and the second magnet are each positioned such that the first magnet lies adjacent the second magnet when the first peeler is nested against the second peeler, the first magnet and the second magnet further being aligned such that the first magnet is attracted to the second magnet when the first peeler is nested against the second peeler.

2. The vegetable peeler set of claim 1, wherein the first handle further comprises a projection and the first second handle comprises a notch, the projection being received within the notch when the first peeler is nested against the second peeler.

3. The vegetable peeler set of claim 1, wherein the first magnet is embedded within the first handle and the second magnet is embedded within the second handle, and further wherein the first tool head is integrally formed with the first handle and the second tool head is integrally formed with the second handle.

4. The vegetable peeler set of claim 1, wherein the first blade is aligned axially with the first handle.

5. The vegetable peeler set of claim 4, wherein the second blade is aligned orthogonal to the second handle.

6. The vegetable peeler set of claim 5, wherein the first handle further comprises a projection and the second handle comprises a notch, the projection being received within the notch when the first peeler is nested against the second peeler.

7. The vegetable peeler set of claim 6, wherein the first projection is formed at the proximal end of the first handle, and the notch is formed at the proximal end of the second handle.

8. The vegetable peeler set of claim 1, wherein the first magnet is permanently secured to the first handle and the second magnet is permanently secured to the second handle.

* * * * *